United States Patent
Page (10) Patent No.: US 7,706,302 B2
(45) Date of Patent: Apr. 27, 2010

(54) OPTIMIZATION OF ROUTING FORWARDING DATABASE IN A NETWORK PROCESSOR

(75) Inventor: Gregory Page, Sandy, UT (US)

(73) Assignee: Alcatel Lucent, Paris (FR)

( * ) Notice: Subject to any disclaimer, the term of this patent is extended or adjusted under 35 U.S.C. 154(b) by 1018 days.

(21) Appl. No.: 10/941,529

(22) Filed: Sep. 14, 2004

(65) Prior Publication Data
US 2006/0056412 A1    Mar. 16, 2006

(51) Int. Cl.
H04L 12/28    (2006.01)
(52) U.S. Cl. .................. 370/254; 370/408; 711/200
(58) Field of Classification Search .......... 711/200–221
See application file for complete search history.

(56) References Cited

U.S. PATENT DOCUMENTS

| | | | |
|---|---|---|---|
| 4,920,536 A * | 4/1990 | Hammond et al. ............. | 714/5 |
| 5,058,006 A * | 10/1991 | Durdan et al. .............. | 711/122 |
| 5,515,370 A | 5/1996 | Rau | |
| 5,564,035 A * | 10/1996 | Lai ............................ | 711/122 |
| 5,978,951 A | 11/1999 | Lawler et al. | |
| 6,105,110 A | 8/2000 | Watkins | |
| 6,311,212 B1 | 10/2001 | Chong et al. | |
| 6,526,474 B1 | 2/2003 | Ross | |
| 6,535,951 B1 | 3/2003 | Ross | |
| 6,570,877 B1 | 5/2003 | Kloth et al. | |
| 6,859,453 B1 * | 2/2005 | Pick et al. ................... | 370/358 |
| 7,017,026 B2 * | 3/2006 | Yoaz et al. ................... | 711/213 |
| 2003/0221060 A1 * | 11/2003 | Umberger et al. ........... | 711/114 |
| 2003/0231628 A1 | 12/2003 | Harada et al. | |
| 2004/0030845 A1 * | 2/2004 | DeLano et al. .............. | 711/150 |
| 2004/0090961 A1 | 5/2004 | Lespagnol | |
| 2004/0111443 A1 * | 6/2004 | Wong et al. ................. | 711/203 |
| 2004/0146044 A1 | 7/2004 | Herkerdorf et al. | |
| 2004/0268048 A1 * | 12/2004 | Homewood ................. | 711/120 |

FOREIGN PATENT DOCUMENTS

EP    0993156 A2    4/2000

OTHER PUBLICATIONS

Chao, H. Jonathan, Lam, Cheuk H., and Oki, Eiji, *Broadband Packet Switching Technologies A practical Guide to ATM Switches and IP Routers*, 2001, pp. 365-404, John Wiley & Sons, Inc., USA.

* cited by examiner

*Primary Examiner*—Chirag G Shah
*Assistant Examiner*—Joshua Smith
(74) *Attorney, Agent, or Firm*—Raymond M. Galasso; Galasso & Associates, L.P.

(57) ABSTRACT

A routing device and associated method for allocating the nodes of a multi-way trie of a forwarding routing table between two or more memory devices is disclosed. In the preferred embodiment, the routing device comprises a routing table for storing a plurality of routes in a multiway trie in a first memory for caching a first set of the plurality of trie nodes and a second memory for caching a second set of the plurality of trie nodes; and a route manager adapted to relocate one or more nodes of the second set from the second memory to the first memory such that the a utilization count for each of the nodes of the first memory is higher than each of the nodes of the second memory.

25 Claims, 11 Drawing Sheets

| VALID_BIT 501 | STOP_BIT 502 | INDEX 503 |
|---|---|---|
| 1 | 0 | INDEX-1 |
| 1 | 1 | INDEX-2 |
| 0 | 1 | --- |
| ⋮ | ⋮ | ⋮ |

OPTIMIZATION OF ROUTING FORWARDING DATABASE IN A NETWORK PROCESSOR

FIELD OF INVENTION

The invention generally relates to optimized route look-up in a data communication network routing device. In particular, the invention relates to a system and method for allocating network route information between a plurality of memory devices having difference access speeds and thereby reducing the route determination time in a network processor.

BACKGROUND

Multi-layer network switches and routers in data communications network sometimes employ specialized application-specific integrated circuits (ASICs) designed to perform a large number of switching and routing operations on packet data. These ASICs include network processors (NPs) adapted to perform many of the Open Systems Interconnect (OSI) data link layer (Layer 2) switching operations and network layer (Layer 3) routing operations. NPs with routing capabilities generally compile and maintain routing tables that are used to retrieve the next-hop address for thousands of routes. The routing tables, e.g., Routing Forwarding Databases (RFDs), are retained in on-chip registers that are both fast and programmable.

While the register of a NP may store thousands of network routes, this may be insufficient to accommodate all the network addresses learned by the router in the course of operation. When the number of routes exceeds the maximum capacity of the NP, an attempt to write additional routes may fail on insertion or lead to unpredictable routing behavior. As a result, contemporary routers attempt to avoid such problems by limiting the number of routes saved to the NP and deleting those routes that exceed its maximum storage capacity. This practice, however, is not a solution because it results in the deletion of valid routes even if the routes are used more frequently than routes already retained by the registers.

There is therefore a need for a system and method to augment the storage capacity of NPs in a manner that provides a NP with access to all known routes while giving precedence to the routes that are used most frequently.

SUMMARY

The present invention in the preferred embodiment features a routing device comprising a port adapted to receive a protocol data unit (PDU); a routing table adapted to store a plurality of routes in a multi-way route trie comprising a plurality of route trie nodes, the routing table comprising a first memory for caching a first set of the plurality of route trie nodes, and a second memory for caching a second set of the plurality of route trie nodes; a routing engine adapted to search the routing table for one of the plurality of routes associated with the received PDU; and a route manager adapted to relocate one or more nodes of the second set from the second memory to the first memory, wherein a utilization count for each of the nodes of the first memory is higher than each of the nodes of the second memory. In the preferred embodiment, the route manager is further adapted to relocate one or more nodes of the first set from the first memory to the second memory.

In the preferred embodiment, the first memory has an access speed higher than the second memory. The second memory may be a random access memory, for example, and the first memory may be a register memory of an application-specific integrated circuit (ASIC) such as a network processor. Using the present invention, the routing device may assign and re-assign, as needed, the most frequently searched nodes of the multi-way route trie to the fastest memory, thereby reducing the time required to search the routing table.

When the search of the routing table identifies a match using the Internet Protocol (IP) address of the PDU, for example, the routing device retrieves forwarding information including the next-hop address to which to transmit the PDU. The more frequently a node of the route trie is searched, the higher its associated utilization count. In the preferred embodiment, the utilization count for the nodes in the network processor is generally an idle time represented by the number of idle digital micro-processor clock cycles elapsed since the node was last accessed for purposes of a route search. The utilization count for a node in the second memory is preferably the frequency with which the node is searched in a period of time given by the network administrator, for example.

The invention in some embodiments is a method of caching a plurality of routes in a forwarding routing database in a routing device comprising a first memory and a second memory, each of the plurality of routes being associated with a plurality of nodes organized in the form of a multi-way route trie. The method comprises the steps of: assigning nodes associated with one or more of the plurality of routes to the first memory if memory space is available; assigning nodes associated with one or more of the plurality of routes to the second memory if memory space in the first memory is unavailable; generating a utilization count for one or more nodes assigned to the first memory and for one or more nodes assigned to the second memory; comparing the utilization count for the one or more nodes assigned to the first memory with the utilization count for the one or more nodes assigned to the second memory; and if the utilization count of at least one of the one or more nodes in the second memory exceeds the utilization count of at least one of the one or more nodes in the first memory, then reassigning the at least one node in the second memory to the first memory. In the preferred embodiment, the method further includes the step of reassigning the at least one node in the first memory to the second memory if the utilization of the at least one node in the second memory exceeds the utilization count of the at least one node in the first memory.

If the first memory is a relatively fast memory and the second memory a relatively slow memory, the invention will reassign the nodes of the multi-way route trie such that the most frequently searched nodes of the route trie are assigned to the first memory. In the process, the method of the preferred embodiment of the invention is adapted to relocate frequently accessed nodes in the second memory to the first memory to minimize the average time required to execute a search of the route trie and retrieve the forwarding information associated with the inbound PDU.

BRIEF DESCRIPTION OF THE DRAWINGS

The present invention is illustrated by way of example and not limitation in the figures of the accompanying drawings, and in which.

DETAILED DESCRIPTION

Figure 1:
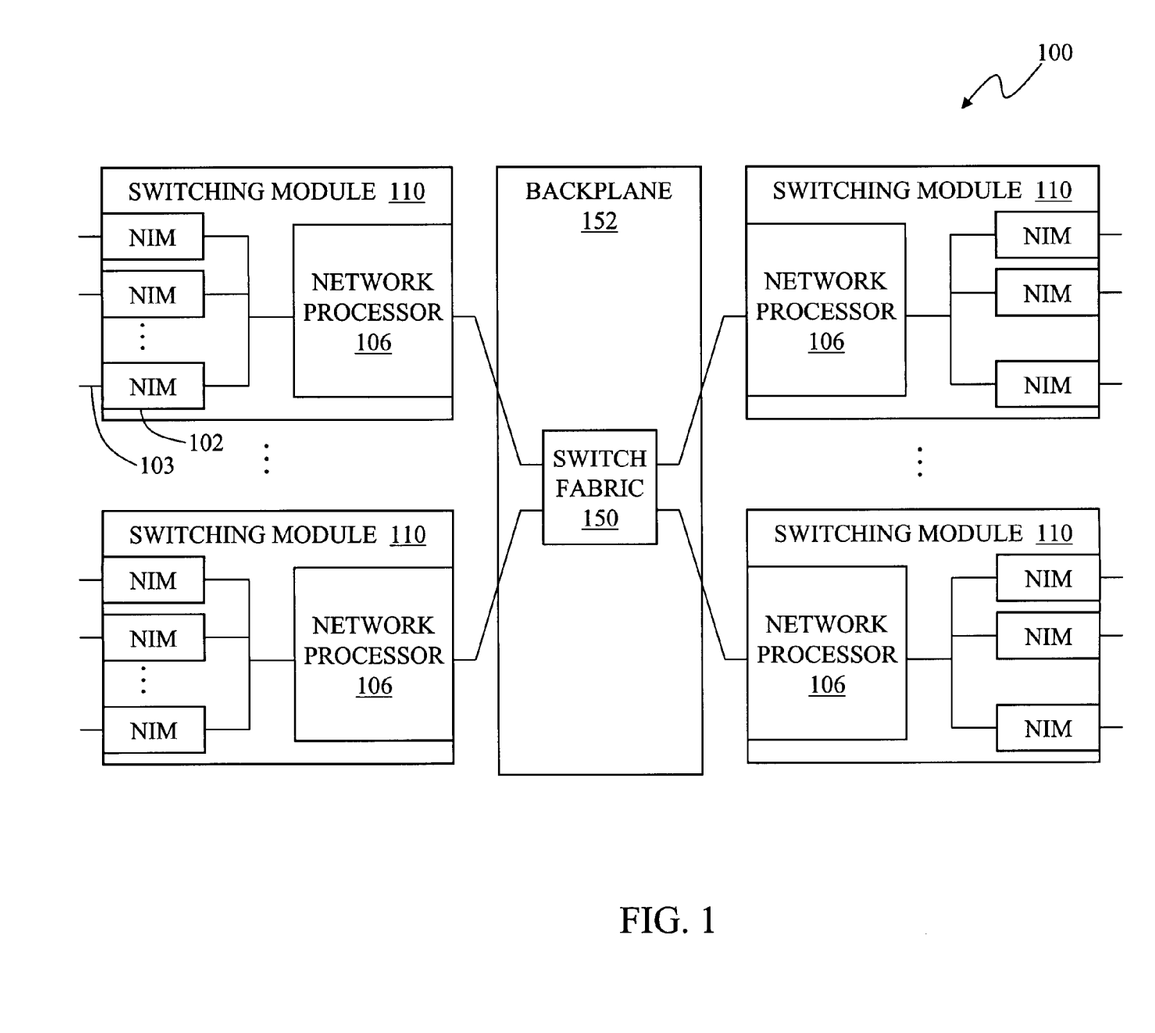
FIG. 1 is a functional block diagram of a multi-layer routing device, according to the preferred embodiment of the present invention.

Illustrated in FIG. 1 is a functional block diagram of a multi-layer routing device for multiplexing data packets through a communications network. The routing device 100 is one of a plurality nodes and other addressable entities operatively coupled to a communications network such as a local area network (LAN), a wide area network (WAN), a metropolitan area network (MAN), an Internet Protocol (IP) network, the Internet, or a combination thereof, for example. The routing device 100 preferably comprises a plurality of switching modules 110 operatively coupled to one another by means of a switch fabric 150 for transmitting protocol data units (PDUs) between switching modules. A switching module 110 may take the form of a switch processor, switching element, or switching blade adapted to detachably engage a slot or bus system (not shown) in the backplane 152 that operatively couples each of the switching modules 110 to one another.

Each of the plurality of switching modules 110 comprises at least one network interface module (NIM) 102 including one or more external ports 103 operatively coupled to a network communications link. Each of the plurality of switching modules 110 in the preferred embodiment further comprises one or more network processors (NPs) 106 generally capable of, but not limited to, at least Layer 2 switching and Layer 3 routing operations as defined in the Open Systems Interconnection (OSI) reference model. As such, each of the modules 110 is adapted to transmit protocol data units (PDUs) to and receive PDUs from the network via NIMs 102, and to transmit PDUs to and receive PDUs from one another by means of the switch fabric 150.

For purposes of this application, PDUs flowing into a switching module 110 from a communications link toward the switch fabric 150 are referred to herein as ingress PDUs, and the switching module 110 through which the ingress PDUs enters the routing device 100 is generally referred to as an ingress switching module. PDUs flowing from the switching fabric 150 to a communications link are referred to herein as egress PDUs, and the switching module from which they are transmitted is referred to as an egress switching module. Each of the plurality of switching modules 110 of the present embodiment may serve as both an ingress switching module and an egress switching module depending on the flow and its direction.

Figure 2:
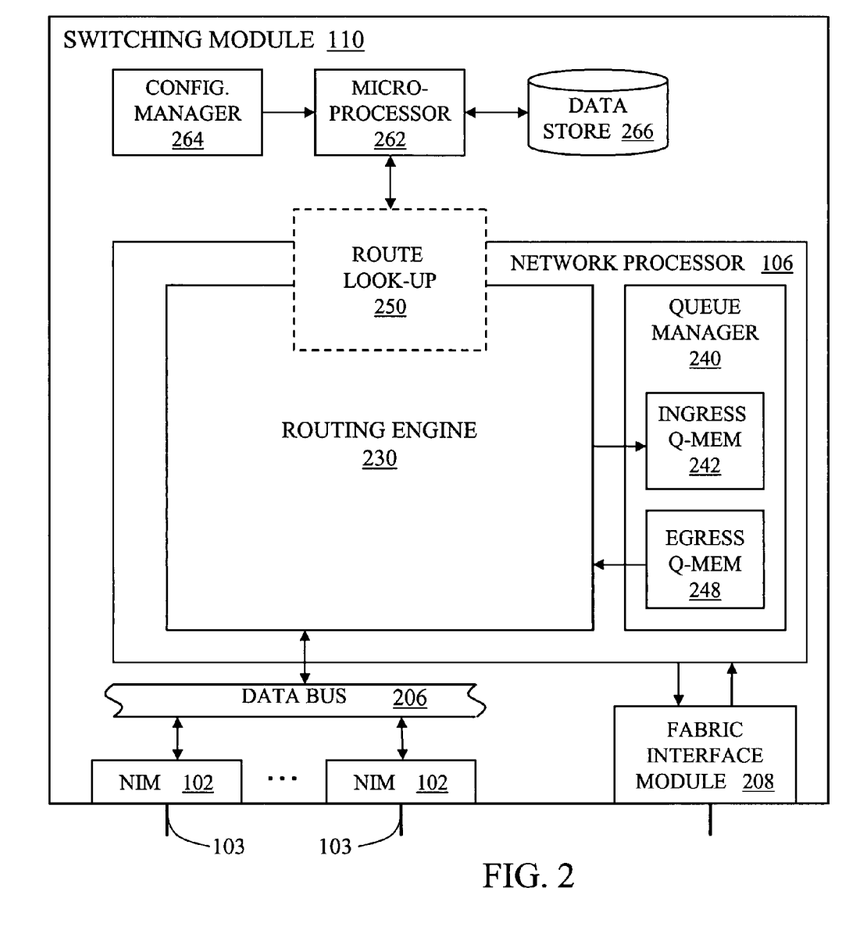
FIG. 2 is a functional block diagram of a switching module, according to the preferred embodiment of the present invention.

Illustrated in FIG. 2 is a functional block diagram of a switching module for performing optimized multi-memory route allocation. The switching module 110 preferably comprises at least one NIM 102, at least one NP 106, a microprocessor 262, and a fabric interface module 208. Each of the NIMs 102 is operatively coupled to one or more external ports for purposes of receiving and transmitting data traffic. In the preferred embodiment, the routing device 100 is an IEEE 802.3-enabled switch and the NIMs 102 are adapted to perform physical layer and data link layer control that operably couple the routing device 100 to one or more communication media including wired, wireless, and optical communications links. The NP 106 in the preferred embodiment is a gigabit ethernet switch, model number BCM5695, produced by BROADCOM Corporation of Irvine, Calif.

Ingress PDUs received by NIMs 102 are transmitted via an internal data bus 206 to the NP 106 where an NP routing engine 230 makes switching and routing decisions based upon properties associated with the ingress PDU including, for example, the destination and source addresses, protocol type, priority information, and virtual local area network (VLAN) information including 802.1Q tags. Routing decisions are determined from among numerous routes retained in the route look-up 250. The switching module 110 of the preferred embodiment is adapted to retain a complete record of all known routes using two or more memory stores including (1) a first memory internal to the NP 106 and (2) a second memory external to the NP 106 that augments the inherently limited memory capacity of the NP alone. The routes, costs and the associated next-hop addresses to which the ingress PDUs are to be forwarded are manually configured by the network administrator via the configuration manager 264 and or compiled by the micro-processor 262 using a dynamic routing protocol such as Open Shortest-Path-First (OPSF), for example, in combination with an Address Resolution Protocol (ARP).

After the next-hop destination address of an ingress PDU is identified, the routing engine 230 performs substantially all packet processing necessary to transmit the PDU from the routing device 100. The packet processing operations may include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, and coloring marking used for policing and traffic shaping, for example.

After packet processing by the routing engine 230, the PDU is temporarily buffered in the ingress queue memory 242 by the queue manager 240 until the bandwidth is available to transmit the PDU through the switching fabric 150. The PDU is then transmitted via the fabric interface module 208 to the appropriate egress switching module for transmission in the direction of the PDU's destination node.

In the preferred embodiment, the fabric interface module 208 is adapted to both transmit ingress PDUs to the switching fabric 150 as well as receive egress PDUs from each of the other one or more switching modules. In the preferred embodiment, the egress data received from the fabric interface module 208 is buffered in egress queue memory 248, passed through the routing engine 230 for statistical processing, for example, and transmitted from the appropriate egress port via one of the NIMs 102.

Figure 3:
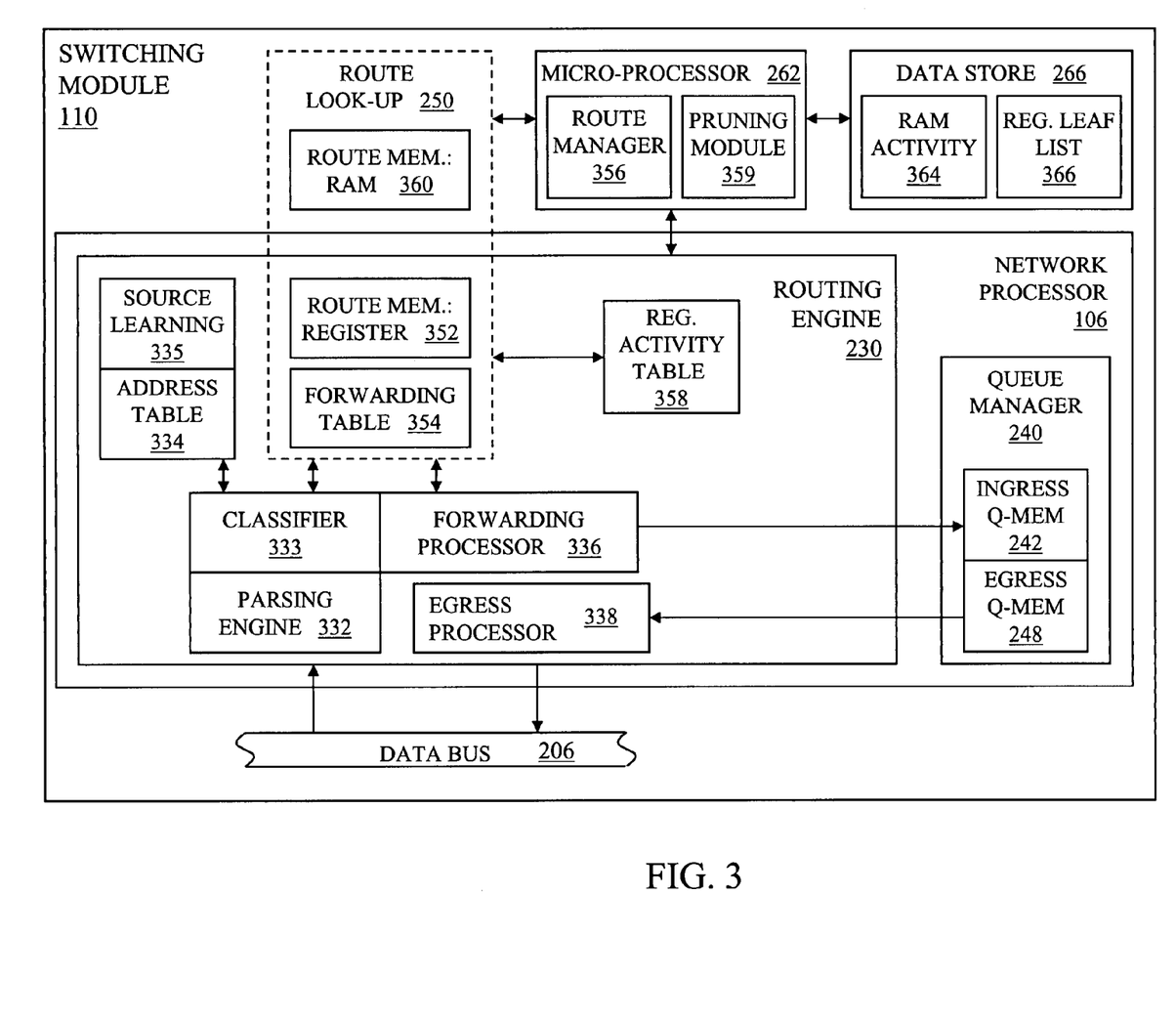
FIG. 3 is a functional block diagram of a switching module depicting the route look-up including memory both internal and external to the NP, according to the preferred embodiment of the present invention.

Illustrated in FIG. 3 is a functional block diagram of a switching module adapted to perform optimized multi-memory route look-up by allocating route storage between a plurality of memory devices. In particular, the switching module 110 retains routes in a route look-up spanning the first memory, i.e., a primary route memory internal to the NP 106, and a second memory, i.e., secondary route memory. The secondary route memory is typically slower than the primary route memory and may be located internal or external to the NP 106. The optimum allocation of routes between the primary route memory and the secondary route memory is determined by the micro-processor 262 based upon route usage statistics compiled by the NP 106 as well as the micro-processor 262.

As illustrated in greater detail in FIG. 3, the NP routing engine 230 of the preferred embodiment comprises a parsing engine 332, a classifier 333, a forwarding processor 336, and an egress processor 338. The parsing engine 332 inspects the ingress frames received from the NIMs 102 and extracts one or more fields relevant to identification, forwarding, and routing of the ingress PDUs. The PDU is switched to the appropriate egress port without alteration if the destination media access control (MAC) address is known. If unknown, the source MAC is added to the layer 2 address table 334 on the ingress port by the source learning 335 and the PDU transmitted to all associated egress ports.

If the frame includes the destination MAC address of the switching module 110 and the destination IP address of another node, for example, the classifier 333 attempts to identify the destination node, the corresponding route and the address of the next-hop on the path to the destination node. In doing so, the classifier 333 preferably generates an index from one or more fields of the ingress PDU with which it searches the route look-up 250. If a match is detected, the route look-up 250 retrieves a pointer to the forwarding information in the NP forwarding table 354, the forwarding information used by the forwarding processor 336 to encapsulate the packet with a new physical layer header including the next-hop address, and the PDU transmitted to the queue manager 240. The queue manager 240 buffers the PDUs in the ingress memory 242 with the requisite class of service (CoS)/quality of service (QoS) requirements and subsequently releases the PDUs to the switching fabric 150 in accordance with a bandwidth allocation scheme such as strict priority or weighted fair queuing, for example.

In the preferred embodiment, the route look-up 250 comprises (a) relatively fast primary route memory in the NP 106 for retaining the most frequently utilized routes and (b) secondary route memory external to the NP 106 to supplement the primary route memory. In the preferred embodiment, the NP employed is a Broadcom 5695 network processor. The faster primary route memory internal to the NP 106 is a register memory 352 adapted to cache approximately 3800 IPv4 routes. External to the NP is additional secondary route memory, including the random access memory (RAM) 360, for storing additional routes needed to extend the capacity of the switching module 110.

As discussed in more detail below, the routes are logically organized in the form of searchable route trees, or "tries" from the word "reTRIEval," including route trie nodes that correspond to one or more bits of the associated route. In the preferred embodiment, the bits of the destination address may be divided across route trie nodes stored in both the register 352 and RAM 360. In the preferred embodiment, the distribution of nodes between the register 352 and RAM 360 is dynamically defined and periodically redefined in order to place the most frequently used nodes in the register. In this manner, the registers 352 and RAM 360 are able to retain all the routes of interest while minimizing the average route determination time.

The frequency with which the nodes of the search trie retained in the registers 352 are accessed is monitored by the NP 106 and recorded in the register activity table 358. In the case of the Broadcom 5695 NP, the frequency, also referred to as a utilization count, is measured in the form of a hit rate acquired over a given period of time, each search of a node giving rise to a hit.

The frequency, i.e., the utilization count, with which the route trie nodes retained in the RAM 360 are accessed, is compiled by the micro-processor 262 and recorded in the form of one or more RAM activity tables 364 retained in the data store 266. Although the same metric may used to determine the activity of nodes in RAM 360 and the registers 352, the switching module 110 in the preferred embodiment measures activity of nodes in RAM 360 in terms of the numbers of times the nodes are accessed for purposes of a route search in a given period of time.

The RAM activity table 364 includes a list of each subtrie root node in the RAM trie and its utilization count. A subtrie root is a root node of a portion of the route trie that is retained only in the secondary route memory 360 but not the primary route memory. A subtrie may be one or more nodes in depth and be headed by a subtrie root whose parent node in the route trie is retained in the primary route memory 352. For consistency, the utilization count of a subtrie root is equal to the maximum utilization count of all of its children nodes. In the preferred embodiment, the list of subtrie roots is sorted by utilization from most utilized to least utilized to facilitate the identification and relocation of the most active nodes to the primary route memory 352, if necessary.

In some embodiments, the micro-processor 262 also maintains a register leaf list 366 retained in data store 266. The register leaf list 366 is preferably a data structure used by the micro-processor 262 to locally track the utilization counts provided by the register activity table 358. The utilization counts retained in the register leaf list 366 are compiled by the NP 106 and subsequently used by the micro-processor 262 to facilitate the identification and relocation of the least active nodes in the primary route memory 352 to the secondary route memory 360.

Figure 4:
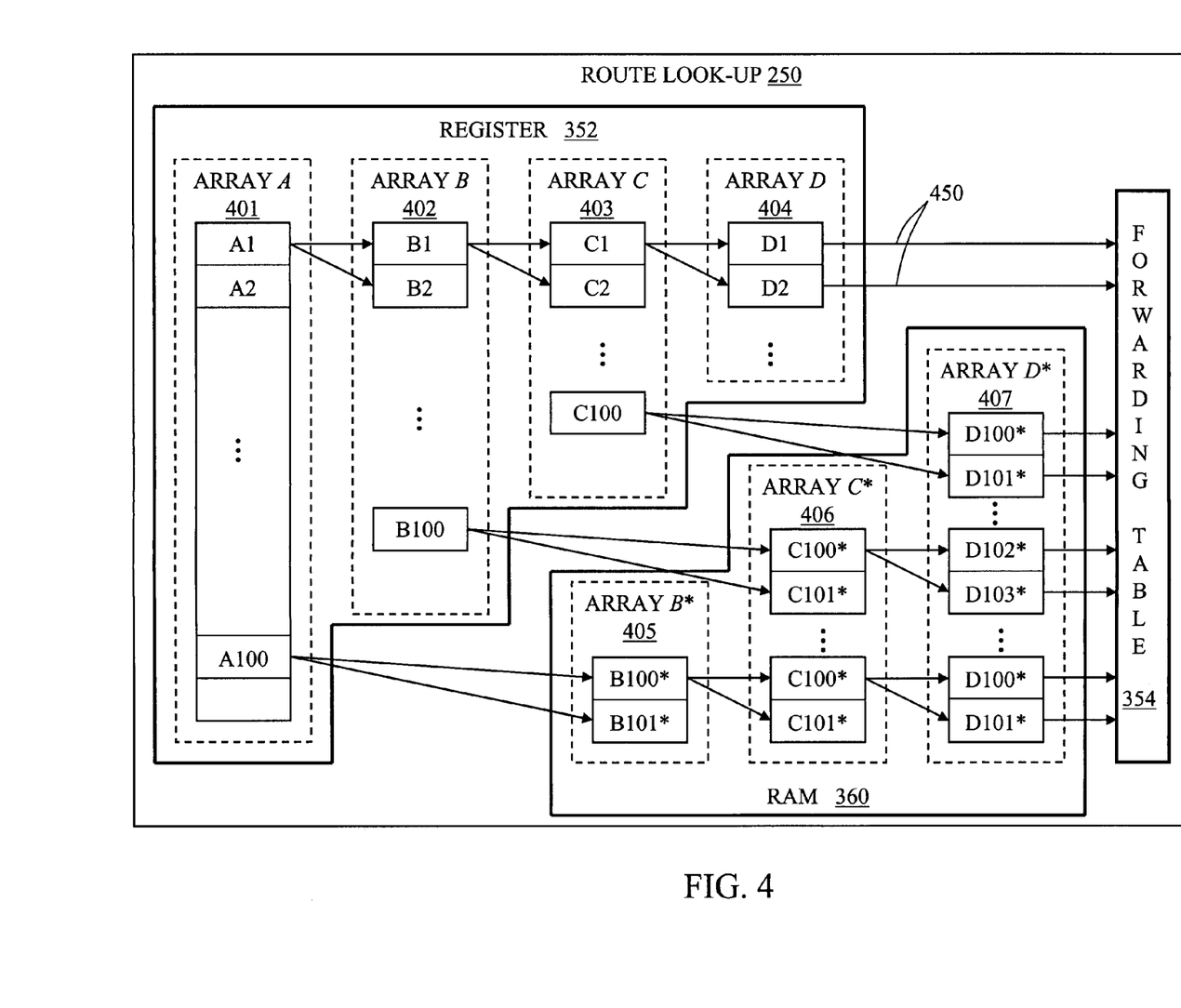
FIG. 4 is the route look-up comprising a multiway data structure and forwarding table, according to the preferred embodiment of the present invention

Illustrated in FIG. 4 is the route look-up comprising a multi-memory, multi-way data structure and forwarding table. The multiway data structure, also known as a retrieval tree or "trie" structure, is employed by the switching module 110 to search route data with one or more packet properties and retrieve an associated pointer into the forwarding table 354. The trie structure includes a plurality of hierarchical arrays populating the register memory 352 and the RAM 360, each array corresponding to one or more nodes in the route trie structure. The primary route memory, i.e., register memory 352, is generally a high-speed memory of hardware-limited capacity fixed at the time the NP 106 is manufactured. The secondary route memory, i.e., RAM 360, is typically external to the NP 106 and is more cost-effective that on-chip register memory 352. The RAM 360 generally has greater storage capacity than the register memory 352 and can readily store all the hierarchical arrays needed to provide searchable access to all known routes in even a large network.

In some embodiments, the secondary route memory is adapted to store the complete route trie including those nodes also retained in the primary route memory. For simplicity of explanation, however, the secondary route memory illustrated in FIGS. 4 and 7-10 comprises only those nodes that are excluded from the primary route memory due to their relatively low utilization count, for example.

The number and size of the arrays in RAM 360 may be defined and dynamically redefined by the micro-processor 262 to provide the routing engine 230 a complete topological view of the network. Due to the faster access speeds, however, learned routes are first recorded to the register memory 352 when space is available, and new nodes created in RAM 360 by the micro-processor 262 if and when the register memory reaches capacity. The new nodes created in RAM 360 refer to the nodes excluded from the register memory 352. One skilled in the art will recognize the benefit of recording all nodes of new routes in RAM 360 to provide a comprehensive and searchable route trie if the search in register memory 352 fails to produce a match.

As illustrated in FIG. 4, the register 352 includes a first hierarchical array A 401, second hierarchical array B 402, third hierarchical array C 403, and fourth hierarchical array D 404, which schematically represent the tiers of the route trie structure used to search a four-byte IPv4 address. Each of the arrays 401-404 is preferably maintained in the NP's register memory 352 for ready access.

The first hierarchical array, array A 401, corresponds to the root node of the trie structure and comprises a plurality of elements including for example elements A1-A2 . . . A100. Each of the elements A1-A2 . . . A100 corresponds to a string comprising the one or more most significant bits of the IPv4 destination address of the received PDU. The fourth hierarchical array, array D 404, represents the leaf nodes of the route trie structure in the register 352 and comprises a plurality of elements including elements D1-D2. Each of the elements D1-D2 corresponds to a string comprising the least significant one or more bits of the IPv4 destination address of the received PDU. A pointer 450 into the forwarding table 354 is retrieved from the leaf node when all bits of the PDU's destination IP address match one of the plurality entries in the array D 404. The second hierarchical array, array B 402, and third hierarchical array, array C 403, correspond to intermediate nodes of the route trie structure, which are searched when traversing between the root node and leaf nodes.

The fifth hierarchical array, array B* 405, sixth hierarchical array, array C* 406, and seventh hierarchical array, array D* 407, represent nodes of the route trie structure that are retained only in RAM 360. The hierarchical arrays 405-407 are managed by the micro-processor 262 switching module software. The nodes in RAM 360 are generally searched if the search in the register memory 352 is terminated by the NP 106 prior to reaching a leaf of the route trie.

Figure 5:
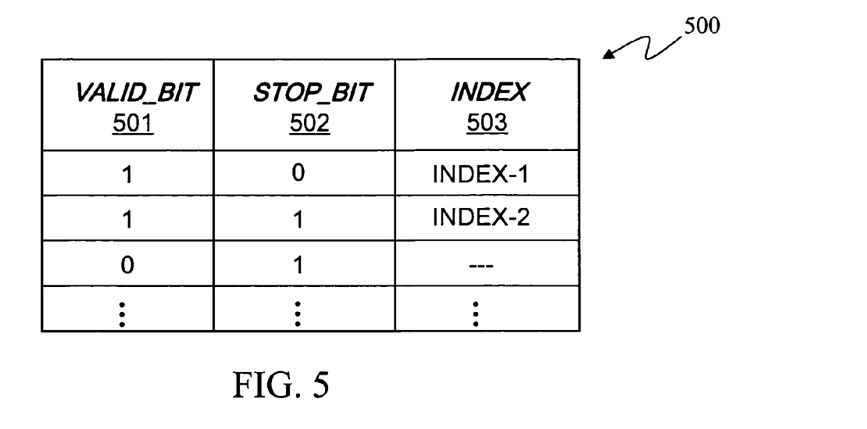
FIG. 5 is a representative hierarchical array depicted in tabular form, according to the preferred embodiment of the present invention.

Illustrated in FIG. 5 is a representative hierarchical array depicted in tabular form. In the preferred embodiment, each entry of the hierarchical array, i.e., each row in the table 500, includes a valid_bit indicator 501, a stop_bit indicator 502, and an index 503 to a child array. Although the hierarchical array 500 generally has the same format independent of whether it is recorded in the register memory 352 or RAM 360, the index 503 of the hierarchical array employed in the NP 106 may include a default value used to force the switching module 110 to terminate the search in the NP 106 and resume the search in the micro-processor 262 using the route data in the RAM 360.

A match is detected between one or more bits of an IP address when the hierarchical array searched includes a valid entry at the position in the array given by value of the one or more bits searched. A series of one or more bits of the IP address having a value of "n," for example, corresponds to the "nth" element in the hierarchical array 500. The entry associated with the value of the one or more bits may then be retrieved by indexing into the memory using a pointer given by the sum of the base value of the array and the value of the bits searched.

When the bits of an address being tested match an entry in the hierarchical array 500, the route look-up 250 inspects the valid_bit indicator 501 to initially determine whether the entry includes a valid index to a subsequent table. A value of one (1) for example, indicates that the index-1 in the third column 503 points to another node in a child array or the forwarding table 354, while a zero (0) value or undefined value, for example, indicates the absence of a matching routing rule. In the absence of a match, the route look-up may apply a default routing rule or apply the route rule associated with the longest prefix match detected to that point in the search.

If the valid_bit indicator 501 is equal to one (1), the route look-up also inspects the stop_bit indicator 502 to determine whether to continue searching the route trie structure.

A stop_bit indicator equal to zero (0) signifies that the index in the third column 503 is a pointer to the next route trie node in register 352 to be searched. A stop_bit indicator with a value of one (1) signifies that the particular node is a leaf node. The leaf node may be either a leaf with respect to the entire route trie or a leaf with respect to the sub-trie retained in register memory 352.

If the leaf node is a leaf with respect to the complete route trie, the route look-up 250 completes the search by retrieving the associated forwarding information from the forwarding table 354 with the pointer from column 503. If the leaf node is a leaf with respect to the portion of the route trie retained in the primary route memory 352 but not the complete route trie, the search by the NP 106 is terminated and resumed by the micro-processor 262 using the secondary route memory 360. A search that ends prematurely in the register 352 and is completed in RAM 360 is said to be sent to "software." A search executed by the micro-processor 262 may be directed to only the route sub-tries in RAM 360 or traverse the complete route trie anew. In the preferred embodiment, the NP 106 forces the search to software and the secondary route memory 360 by setting the index value equal to a default index value.

Figure 6:
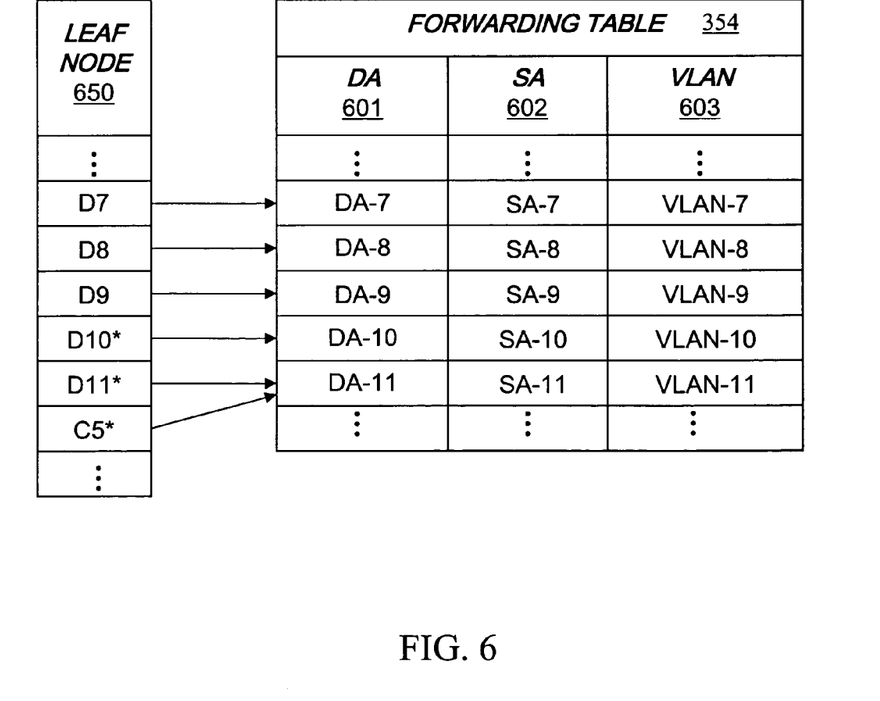
FIG. 6 is a forwarding table employed in the module, according to the preferred embodiment of the present invention.

Illustrated in FIG. 6 is a leaf node providing pointing to a forwarding table employed in the preferred embodiment. Each row of the forwarding table 354 represents a forwarding table entry that is pointed to by the index 503 of a leaf node 650 in the route trie structure. In accordance with the preferred embodiment of the present invention, the plurality of leaf nodes 650 are distributed between both the register 352 and the RAM 360 to provide the NP 106 access to the most frequently used route trie nodes and thereby reduce the search times.

Each entry in the forwarding table 354 includes forwarding information including the next-hop address 601, i.e., the MAC destination address to which the matching PDU is to be forwarded. In some embodiments, the MAC source address 602 and virtual local area network (VLAN) identifier 603 are also retrieved and included in the data link layer header of the PDU when transmitted to the next-hop. One skilled in the art will appreciate that the forwarding table 600 may be adapted to include additional information including the egress port 103 number, for example.

Figure 7:
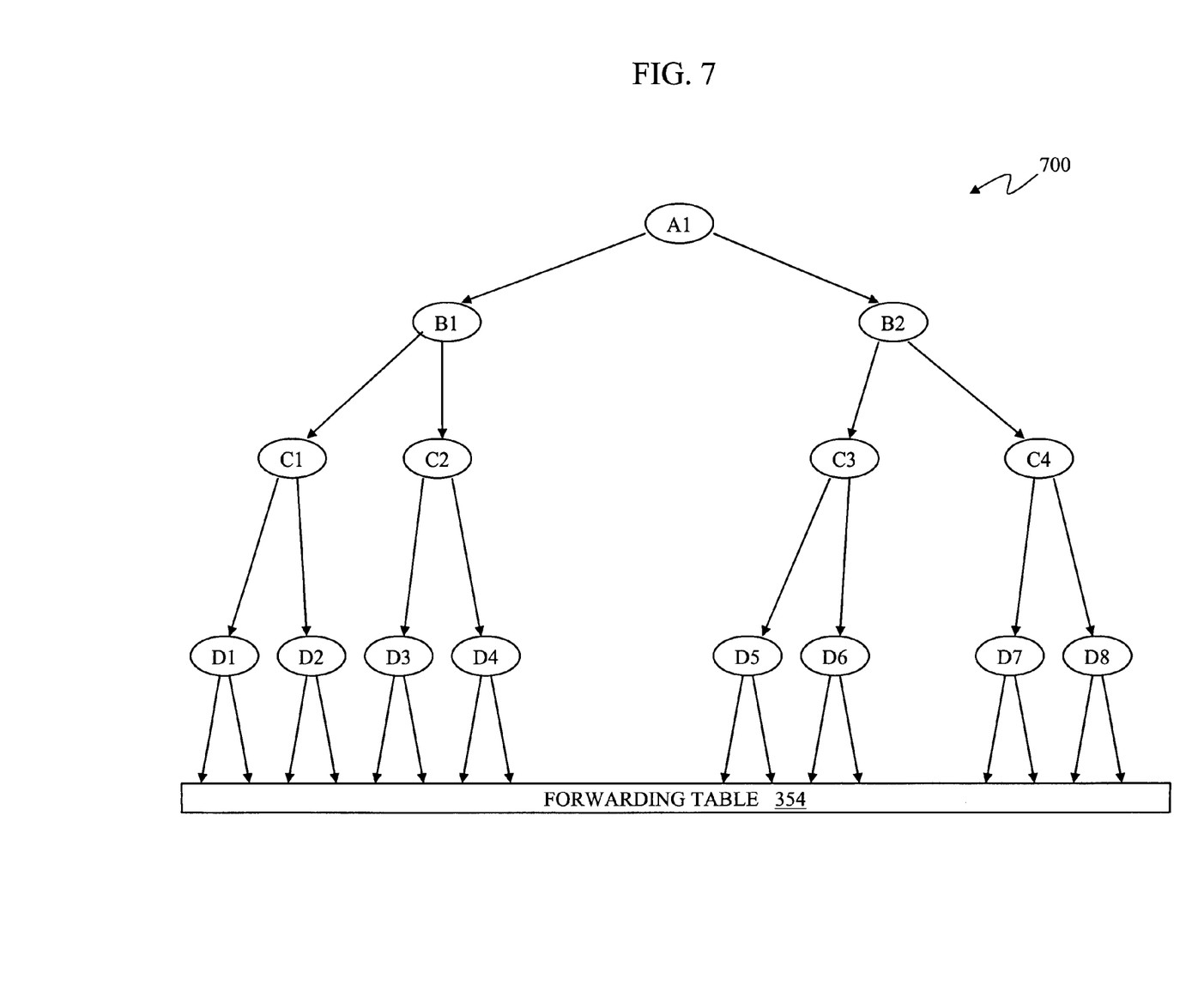
FIG. 7 is a multi-way trie structure schematically representing the route look-up embodied entirely within the NP register, according to the preferred embodiment of the present invention.

Illustrated in FIG. 7 is a multi-way route trie structure schematically representing the route look-up embodied entirely within the primary route memory, i.e., the register memory 352. The route trie structure 700 corresponds to a condition in which the register memory 352 has the capacity to locally cache and resolve each route known to the switching module 110. In this example, therefore, each of the nodes of the route trie 700 is cached in the NP's register memory 352 without the NP 106 resorting to secondary route memory such as RAM 360.

The multiway route trie structure 700 comprises a plurality of nodes whose logical relationship is indicted by branches connecting the nodes. The plurality of nodes includes the root node A1 and intermediate nodes B1-B2, C1-C4, and leaf nodes D1-D8. In general, successive nodes are searched from the root node A1 to one of the plurality of leaf nodes D1-D8 that matches the IP destination address of the ingress PDU. As discussed above, the matching leaf node includes an index pointing to an entry in the forwarding table 354 from which the applicable forwarding information is retrieved.

Figure 8:
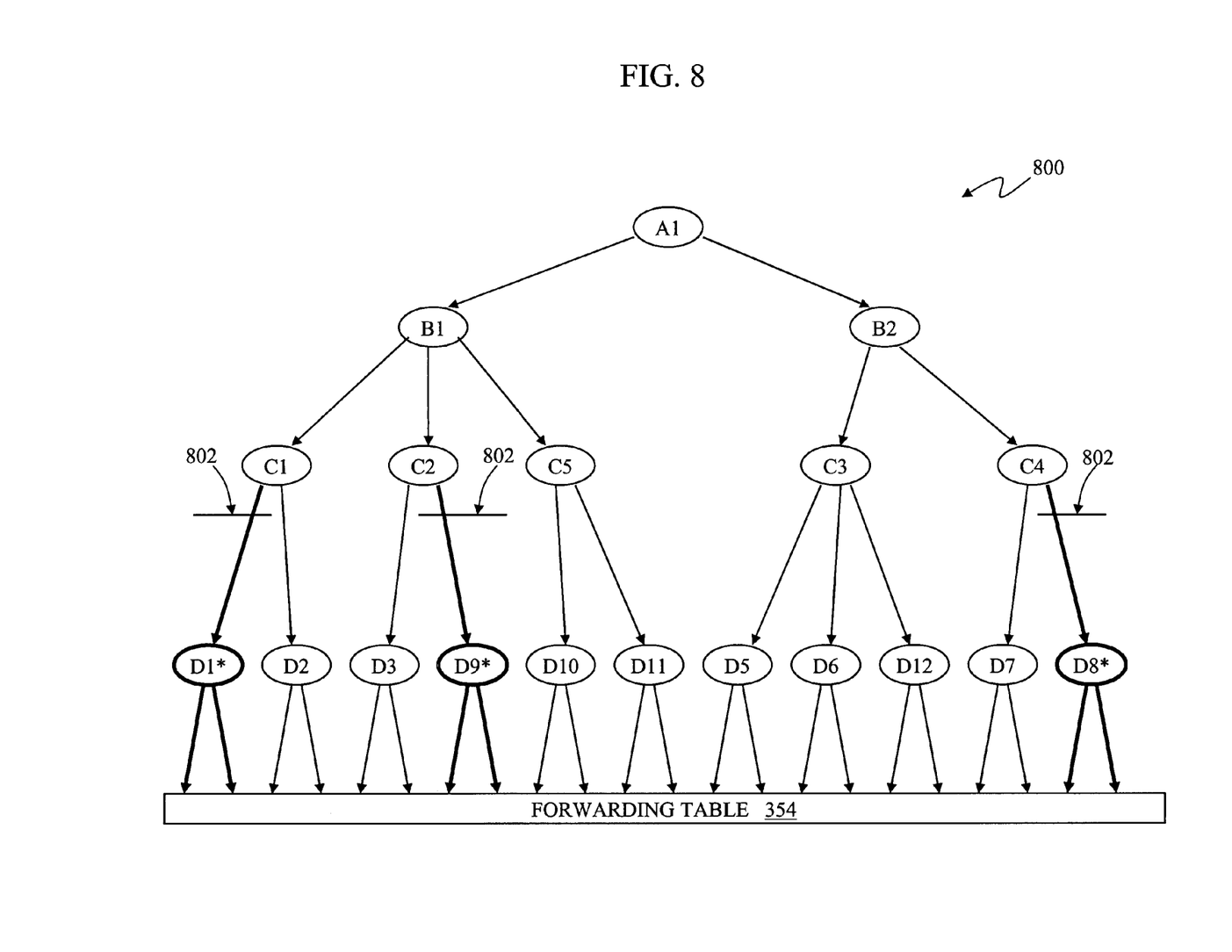
FIG. 8 is a multi-way trie structure schematically representing the route look-up distributed across the internal register and external RAM, according to the preferred embodiment of the present invention.

Illustrated in FIG. 8 is a multi-way route trie structure schematically representing the route look-up distributed across the primary route memory 352 and secondary route memory 360. The route trie structure 800 corresponds to a condition in which the capacity of register 352 is insufficient to locally cache all the routes known to the switching module 110. In this case, one or more of the nodes of the route trie 800 are retained in RAM 360 external to the NP's register memory 352.

Like the multi-way route trie 700 discussed above in regard to FIG. 7, the trie structure 800 comprises a plurality of branches that stem from nodes associated with the criteria to be searched. The plurality of nodes include the root node A1 and intermediate nodes B1-B2, C1-C5, each of which is cached locally in the NP's register memory 352. The leaf nodes here include a first set of nodes D2-D3, D10-12, D5-D7 cached locally in the NP's register memory 352. The route trie also includes a second set of nodes D1*, D8*, D9* retained in RAM 360. The logical boundary between those nodes retained in the register 352 and RAM 360 is illustrated by lines of demarcation 802.

To enable the route look-up 250 to dynamically search between the register 352 and RAM 360, each of the parent nodes associated with child nodes D1*, D8*, D9* in RAM 360 comprises a default index value that causes the route search in the NP 106 to terminate and to revert to the microprocessor 262 using the routing information retained in the secondary route memory. If the search of the secondary route memory 360 produces a match among leaf nodes D1*, D8*, D9*, a pointer to the forwarding table 354 is identified and the applicable forwarding information retrieved.

In the preferred embodiment, newly learned routes are committed to the secondary route memory 360 if the primary route memory 352 is at capacity. That is, the nodes corresponding to newly learned routes are incorporated into the route trie structure in RAM 360 and their utilization count then monitored. If and when the route manager 356 determines that a node in RAM 360 is used relatively more frequently than a node in the register, the node may be automatically relocated to the register memory 352.

Figure 9:
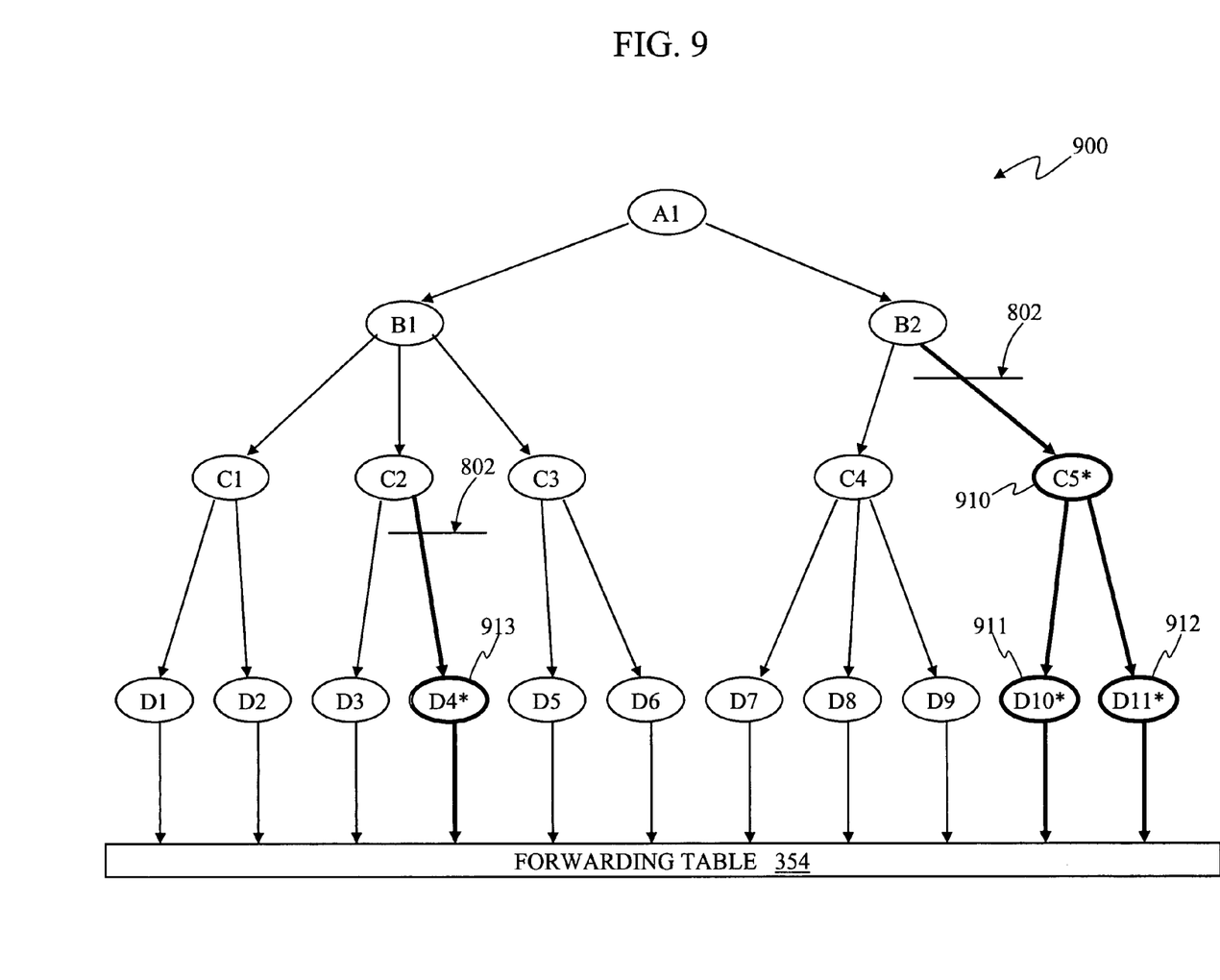
FIG. 9 is a multi-way trie structure schematically representing the route look-up in which the RAM includes one or more sub-tries to augment the register, according to the preferred embodiment of the present invention.

Illustrated in FIG. 9 is a multi-way route trie structure schematically representing the route look-up including one or more sub-tries in secondary memory 360 to augment the register memory 352. As stated above, the RAM 360 may be employed to store one or more leafs as well as one or more sub-tries of the multi-way route trie structure. An entire sub-trie, for example, that branches directly from the root node A1 may be committed to RAM 360 or moved from the register 352 to RAM 360 to free space in the register 352 for routes that are used more frequently so as to take advantage of the relatively faster access speeds offered by the register 352.

A sub-trie retained in RAM 360 may include any number of nodes and may incorporate as many intermediate nodes between the root node and leaf nodes. For example, the sub-trie retained in the RAM 360 comprises the intermediate node C5* 910 and child leaf nodes D10* 911, D11* 912, and D4* 913. A sub-trie structure in RAM 360 may also branch directly from the root node A1 or other intermediate node, as illustrated in FIG. 4 by the sub-trie branching from node A100 to child nodes in hierarchical array B*.

Figure 10:
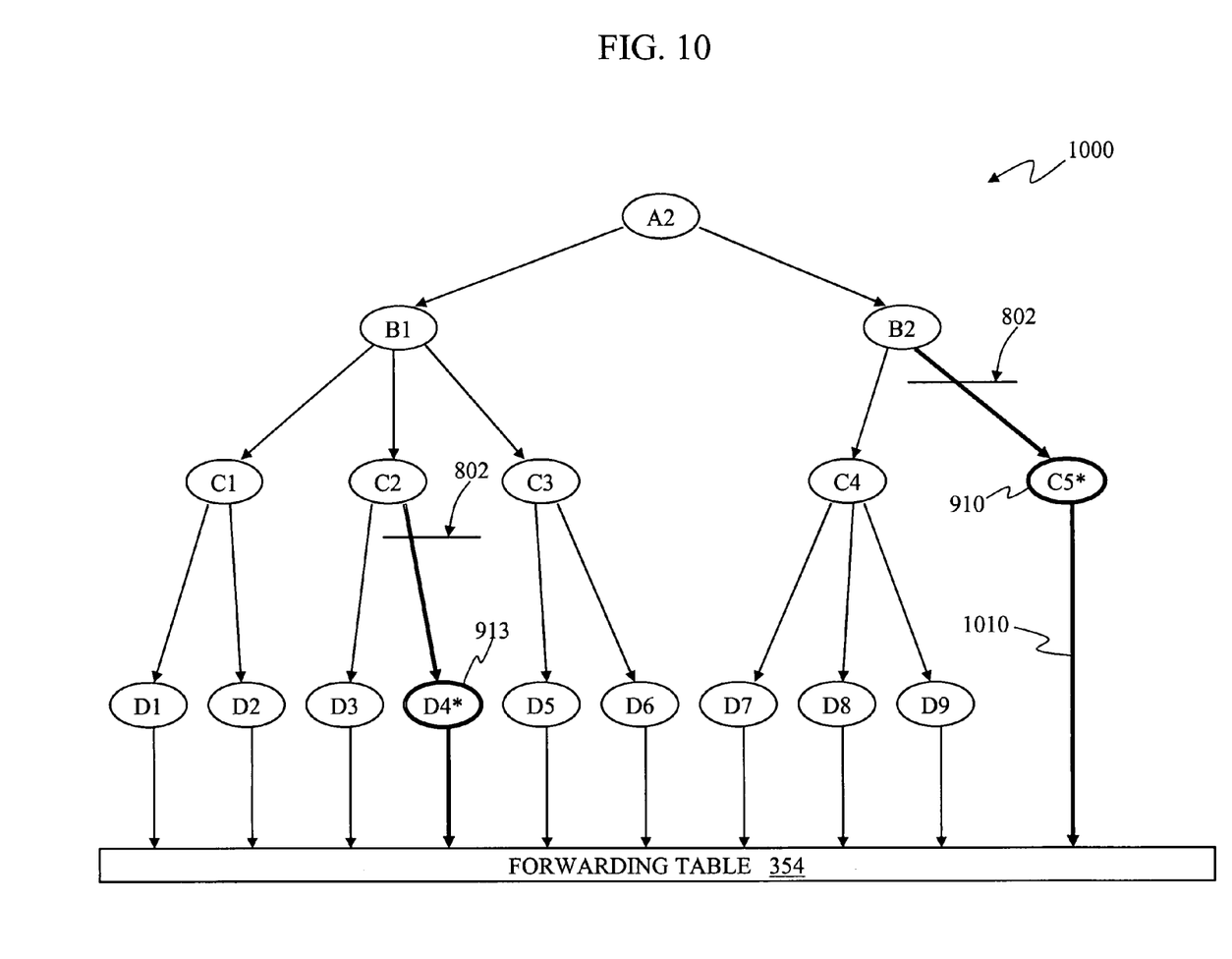
FIG. 10 is the trie structure of FIG. 9 after the trie has been pruned to exploit redundancy in the forwarding information, according to the preferred embodiment of the present invention.

Illustrated in FIG. 10 is the multi-way route trie structure of FIG. 9 after the trie has been pruned to exploit redundancy in the forwarding information. In particular, the switching module 110 of the preferred embodiment is adapted to identify sub-tries having a plurality of leaf nodes as well as intermediate nodes that are associated with identical forwarding information. If the forwarding information is identical for each of the child nodes having a common parent node, the switching module 110 in the preferred embodiment introduce a new entry in the forwarding table 354 that causes the parent node to point directly to the forwarding table 354, thereby resolving the forwarding information without traversing the route trie structure to a true leaf.

If the leaf nodes D10* 911 and D11* 912 in FIG. 9, for example, are associated with the same forwarding information, node C5* is converted from an intermediate node to a quasi-leaf node by forcing it to point directly to the forwarding table 354. That is, if the MAC destination address (DA-10 equals DA-11), MAC source address (SA-10 equals SA-11), and VLAN (VLAN-10 equals VLAN-11) are the same for D10* 911 and D11* 912, the node C5* 910 is altered to terminate the search early and point directly 1010 to the forwarding table 354. In particular, the value of the stop_bit indicator 502 associated with the leaf node C5* 910 is changed from zero (0) to one (1) and a new pointer indexing into the applicable forwarding information inserted in the third column 503 of the of the corresponding entry in the hierarchical array. The entry with the new pointer is represented by the quasi-leaf node C5* 910 in the listing of leaf nodes 650 and points to the pre-existing entry in the forwarding table for either D10* 911 or D11* 912.

In the preferred embodiment, the pruning module 359 is charged with periodically monitoring the register leaf list 366 and the RAM activity table 364 to identify redundancies and collapse sub-tries to increase memory and or reduce search times. The pruning may be applied to sub-tries in the register 352, in RAM 360, or between the register 352 and RAM 360.

One skilled in the art will recognize that the act of making node C5* 910 a quasi-leaf node causes the nodes D10* 911 and D11* 912 to bypassed in the route search process. As a result, nodes D10* 911 and D11* 912 will become inactive and their utilizations counts drop to zero (0). If the nodes D10* and D11* were recorded in the register memory 352 prior to node C5* 910 being made a quasi-leaf, the route look-up 250 would automatically relocate the nodes D10* 911 and D11* 912 to RAM 360 when there activity levels drops below that of the most active nodes in the secondary memory 360. In some embodiments, the redundant nodes, including D10* 911 and D11* 912, may be subsequently removed from the multi-way route trie by a standard route aging mechanism.

Figure 11:
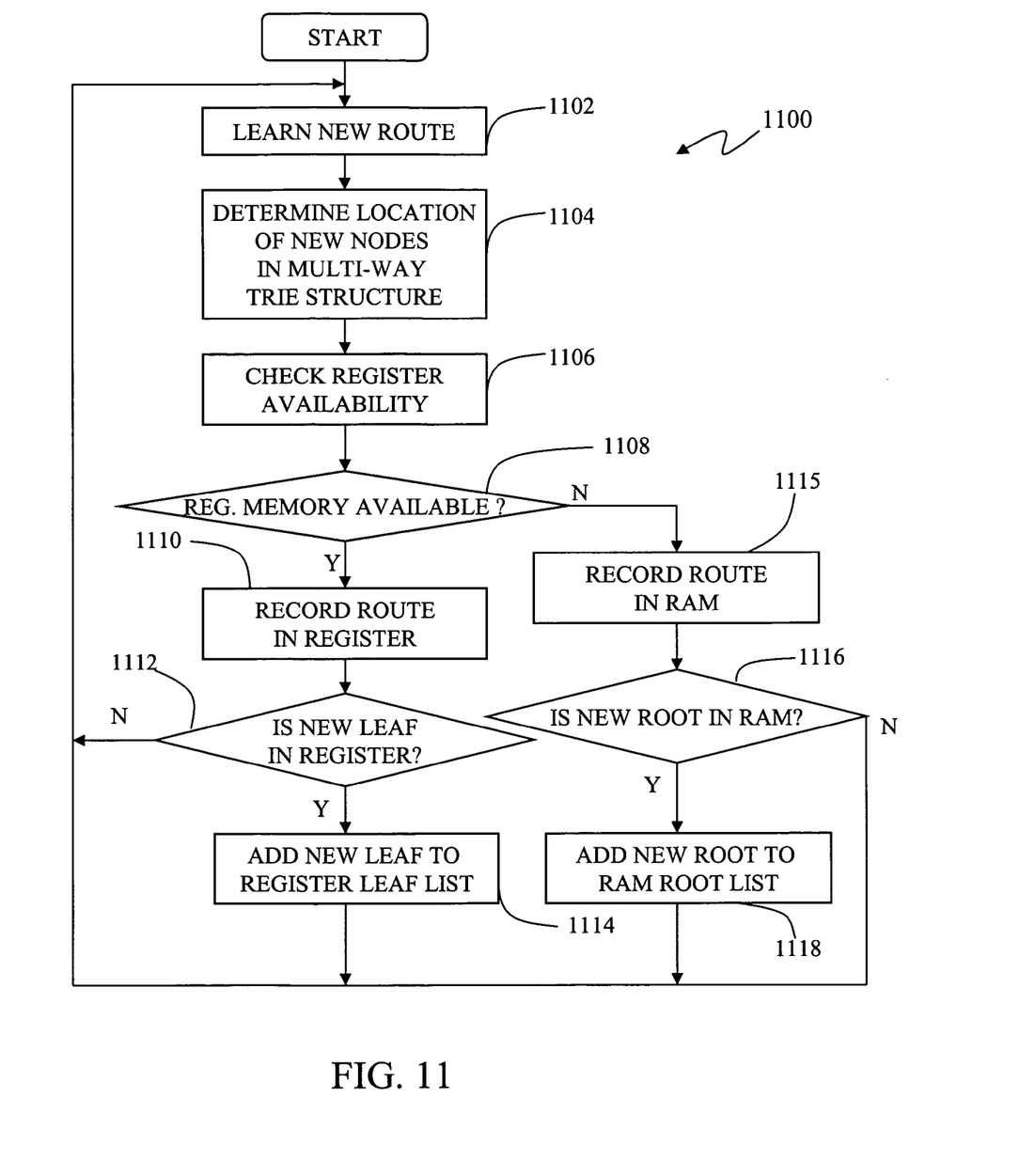
FIG. 11 is flowchart of the process by which the routing device monitors and updates the route look-up, according to the preferred embodiment of the present invention.

Illustrated in FIG. 11 is flowchart of the process by which the switching module monitors and updates the route look-up. The switching module 110, like other routers, dynamically learn (step 1102) new routes from other routers through various route exchange protocols including OSPF, for example, or are manually configured with static routes by the network administrator. The route manager 356 immediately determines (step 1104) where the one or more nodes of the new route is to be inserted in the multi-way route trie structure representing the topology of the network about the routing device 100. In the process of inserting the one or more nodes, the route manager 356 logically links any new nodes to a parent node sharing a common IP address prefix.

The route manager 356 determines (step 1106) the availability of space for the new route in the NP's register memory 352. If memory is available, the register memory determination step (testing step 1108) is answered in the affirmative and the one or more nodes of the new route introduced in the register 352 using a new index 503 inserted (step 1110) into the parent node to account for the new branch. If the new node constitutes a new leaf node in the register 352, the new leaf determination step (testing step 1112) is answered in the affirmative and the route added (step 1114) to a register leaf list 366 used to track the activity of nodes recorded in the register 352 and compare their activity to nodes in RAM 360. The utilization count statistics in the register leaf list 366 are preferably a subset of the statistics compiled by the network processor 106 and compiled in the register activity table 358. The nodes in the register leaf list 366 may be sorted and listed from the most to least active to facilitate the identification and transition of nodes from the register memory 352 to the RAM memory 360.

If there is no available memory in the register 352, the register memory determination step (testing step 1108) is answered in the negative and the new node is recorded (step 1115) in RAM 360. New routes recorded to RAM 360 may also be monitored to determine if and when their utilization count is high enough to warrant relocation to the register memory 352. If the new node is also a new "sub-trie root node", the new root determination (testing step 1116) is answered in the affirmative and the node added (step 1118) to the RAM activity table 364. The term "sub-trie root node" refers to a route trie node in RAM 360 whose parent resides in the register memory 352. The sub-trie roots in RAM 360 lie at the logical boundary between the primary and secondary route memories and are candidates for relocation into the register memory 352 depending on the frequency with which the nodes are searched relative to the frequency of nodes in the register 352.

Figure 12:
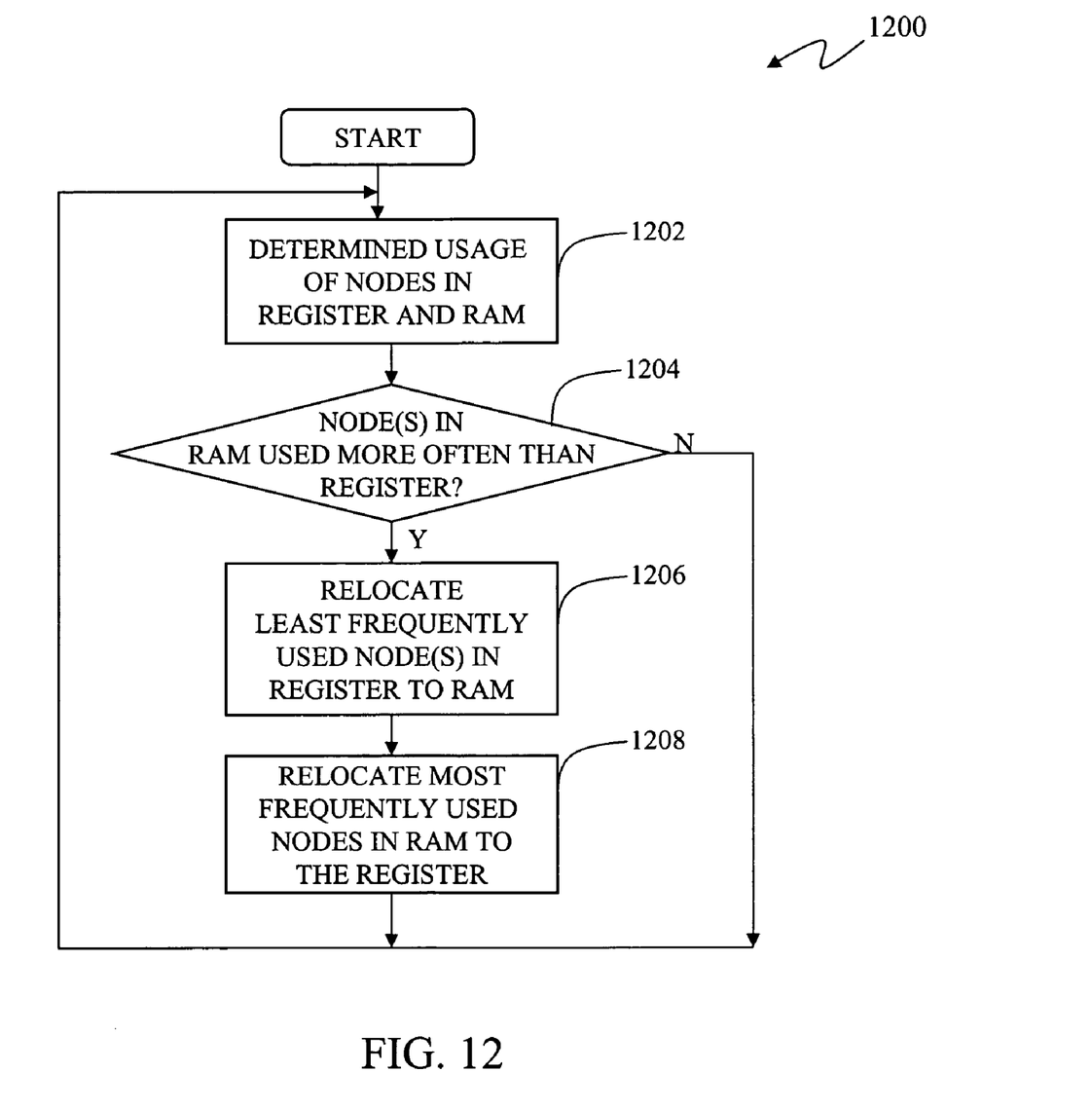
FIG. 12 is flowchart of the process by which the switching module selectively relocates nodes in the route look-up to either the register memory or the RAM based on the activity of the nodes, according to the preferred embodiment of the present invention.

Illustrated in FIG. 12 is a flowchart of the process 1200 by which the switching module monitors route activity and selectively relocates nodes in the route look-up to either the primary route memory 352 or the secondary route memory 360. In the preferred embodiment, the search activity, i.e., utilization count statistic, is the primary factor in determining whether the node is retained in the relatively-fast register memory 352 of the NP 106 or the relatively-slow external RAM 362. In accordance with the preferred embodiment, the nodes that pertain directly to relatively inactive routes are allocated to the relatively slower RAM 360 while the nodes pertaining to relatively active nodes are allocated to relatively fast register memory 352.

In the preferred embodiment, the route look-up 250 determines (step 1202) the utilization count of the leaf nodes listed from the register leaf list 366 and the utilization count of the sub-trie root nodes in from the RAM activity table 364. In the NP 106 of the preferred embodiment, the utilization count of route trie nodes in register memory 352 is automatically tracked by the NP 106 using a preconfigured algorithm. In the preferred embodiment, the NP 106 is configured to increment a "hit bit," i.e., a one-bit counter, associated with a node each time the node is accessed for purposes of a route search. The NP 106 or micro-processor 262 periodically inspects the hit bits of various nodes in the register 352 to determine which hit bits are set. If a hit bit is set, the hit bit is initialized to zero. If the hit bit is not set, a counter tracking the number of idle cycles for the node is incremented. The number of idle cycles per unit time is therefore the measure of activity. Inactive routes may be deleted or "aged out" when not used for a determined period of time. The number of hits required to maintain a route before is it is deleted is preferably a programmable hit threshold determined by the network administrator.

The route manager 356 determines the activity of the route trie nodes retained exclusively in RAM 362 and particularly the sub-trie roots in the activity table 364. For these nodes, the utilization count is a measure of frequency given by the number of times the nodes are searched in a given period of time. In the preferred embodiment, the machine readable instructions executed by the micro-processor 262 cause the route manager 356 to increment a use counter in the RAM activity table 364 when a node is used for purposes of a route search. The period of time over which the use statistics are accumulated is preferably a programmable period of time provided by the network administrator. In the preferred embodiment, the utilization count of a sub-trie root in RAM 360 is equal to the utilization count of its most active child node.

If there are one or more routes in RAM 360 that are used more frequently than the register 352, the relative activity determination test (testing step 1204) is answered in the affirmative and at least one relatively inactive node relocated (step 1206) from the register 352 to RAM 360. With memory now available in the register 352, at least one relatively active route is concurrently relocated from RAM 360 to the register 352 (step 1208). In the preferred, the switching module 110 periodically repeats the process 1200 of relocating nodes, as needed, at an update interval on the order of a one tenth of a second to one second.

In the process 1200 of relocating the nodes between register memory 352 or the RAM 360, the switching module 110 preserves the overall topological organization of trie structure in the route look-up 250. In general, relocation of a node entails: the (a) the creation of an entry in a hierarchical array in the register memory 352 or RAM 360 to which the node is moved; (b) the creation of a pointer in the new entry linking it to the appropriate forwarding information; and (c) the deletion of the existing entry of the array in the memory from which the node is moved.

In addition to there being available memory in the register 352, a node in some embodiments must have an activity level in excess of an idle cycle threshold before the node may be relocated to the register 352. The number of cycles necessary to qualify a route for relocation is preferably a programmable idle cycle threshold determined by the network administrator.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A routing device comprising:
    a port for receiving a protocol data unit (PDU);
    a routing table for storing a plurality of routes in a multi-way trie having a plurality of nodes, the routing table comprising:
        a first route memory for caching a first set of the plurality of nodes; and
        a second route memory for caching a second set of the plurality of nodes that is mutually exclusive from the first set of the plurality of nodes;
    a routing engine in a router for searching the routing table for one of the plurality of routes associated with the PDU; and
    a route manager in a router for relocating one or more nodes of the second set from the second route memory to the first route memory, such that a utilization count for each of the nodes of the first route memory is higher than each of the nodes of the second route memory and such that said route manager generates a utilization count for one or more nodes assigned to the first route memory and for one or more nodes assigned to the second route memory and compares the utilization count for the one or more nodes assigned to the first route memory with the utilization count for the one or more nodes assigned to the second route memory and if the utilization count of at least one of the one or more nodes in the second route memory exceeds the utilization count of at least one of the one or more nodes in the first route memory, then reassigning the at least one of the one or more nodes in the second route memory to the first route memory.

2. The routing device of claim 1, wherein the route manager relocates one or more nodes of the first set from the first route memory to the second route memory.

3. The routing device of claim 1, wherein the first route memory has an access speed higher than the second route memory.

4. The routing device of claim 3, wherein the second route memory is a random access memory.

5. The routing device of claim 3, wherein the first route memory is a register memory.

6. The routing device of claim 5, wherein the routing engine and register memory are embodied in an application-specific integrated circuit (ASIC).

7. The routing device of claim 6, wherein the ASIC is a network processor.

8. The routing device of claim 1, wherein the search of the routing table comprises a search of an Internet Protocol (IP) address of the PDU.

9. The routing device of claim 1, wherein the utilization count for each of the plurality of nodes is a measure of search activity for each node.

10. The routing device of claim 1, wherein the routing device further comprises a forwarding table from which forwarding information is retrieved if one of the plurality of routes associated with the PDU is identified by the routing engine.

11. The routing device of claim 10, wherein each of the plurality of nodes comprises a pointer to either a child node of the multi-way trie or a pointer to associated forwarding information in the forwarding table.

12. The routing device of claim 11, wherein the routing device makes a pointer of a parent node point directly to the forwarding table if each of the one or more child nodes of the parent node are associated with the same forwarding information.

13. The routing device of claim 1, wherein the routing device maintains:
    a first route memory activity list comprising at least one sub-trie leaf nodes; and
    a second route memory activity list comprising at least one sub-trie root nodes;
    wherein each of the at least one sub-trie leaf nodes is a parent node of one or more of the at least one sub-trie root nodes, and each of the at least one sub-trie root nodes is a child node of one of the at least one sub-trie leaf nodes.

14. The routing device of claim 13, wherein one or more nodes of the second set relocated from the second route memory to the first route memory is removed from the second route memory activity list and added to the first route memory activity list.

15. The routing device of claim 1, wherein the route manager relocates one or more nodes at an update interval between one tenth of a second and one second.

16. A method of caching a plurality of routes in a forwarding routing database of a routing device, the routing device comprising a first route memory and a second route memory, each of the plurality of routes being associated with a plurality of nodes organized in the form of a multi-way trie, the method comprising the steps of:
    assigning nodes associated with one or more of the plurality of routes to the first route memory if memory space is available;
    assigning nodes associated with one or more of the plurality of routes to the second route memory if memory space in the first route memory is unavailable wherein none of the nodes associated with the second route memory are already stored in the first route memory;
    generating, in a route manager in a router, a utilization count for one or more nodes assigned to the first route memory and for one or more nodes assigned to the second route memory;
    comparing, in the route manager in the router, the utilization count for the one or more nodes assigned to the first route memory with the utilization count for the one or more nodes assigned to the second route memory; and
    if the utilization count of at least one of the one or more nodes in the second route memory exceeds the utilization count of at least one of the one or more nodes in the first route memory, then reassigning the at least one of the one or more nodes in the second route memory to the first route memory.

17. The method of claim 16, wherein the method further includes the step of:
    reassigning the at least one of the one or more nodes in the first route memory to the second route memory if the utilization of the at least one node in the second route memory exceeds the utilization count of the at least one node in the first route memory.

18. The method of claim 16, wherein the utilization count for nodes assigned to the first route memory is an idle time between route lookups.

19. The method of claim 16, wherein the utilization count for nodes assigned to the second route memory is given by the number of times the node is searched in a period of time.

20. The method of claim 16, wherein the first route memory is characterized by a higher access speed than the second route memory.

21. The method of claim 16, wherein the second route memory is a random access memory.

22. The method of claim 16, wherein the first route memory is a network processor memory.

23. The method of claim 16, wherein the method further includes the step of assigning one or more nodes associated with newly learned routes to the second route memory.

24. A routing device comprising:
   a port for receiving a protocol data unit (PDU) characterized by one or more PDU properties;
   a route memory in a router for storing a plurality of routes in a multiway trie, the route memory comprising:
      a first memory for caching a plurality of nodes of the trie; and
      a second memory that does not contain any of the plurality of nodes from the first memory for caching at least one node of the trie;
   a forwarding table for storing forwarding information associated with the PDU;
   a route manager in a router; said route manager:
      generating a utilization count for the plurality of nodes of the first memory and for the at least one node of the second memory;
      comparing the utilization count for the plurality of nodes of the first memory with the utilization count for the at least one node of the second memory; and
      if the utilization count of a second node in the second memory exceeds the utilization count of a first node having the lowest utilization count in the first memory, then store the second node in the first memory.

25. The method of claim 24, wherein the first memory is embodied in a register memory of a network processor.

* * * * *